US012292175B2

(12) United States Patent
Mevenkamp et al.

(10) Patent No.: US 12,292,175 B2
(45) Date of Patent: May 6, 2025

(54) COVER LENS FOR A VEHICLE LIGHTING DEVICE

(71) Applicant: Hella GmbH & Co. KGaA, Lippstadt (DE)

(72) Inventors: Maximilian Mevenkamp, Hamm (DE); Burkhard Hesse, Erwitte (DE); Hamza Akin, Lippstadt (DE); Ethayakkannan Shanmugavel, Tamilnadu (IN)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/179,833

(22) Filed: Mar. 7, 2023

(65) Prior Publication Data

US 2023/0204186 A1 Jun. 29, 2023

Related U.S. Application Data

(63) Continuation of application No. PCT/EP2020/077068, filed on Sep. 28, 2020.

(51) Int. Cl.
*F21S 45/33* (2018.01)
*F21S 41/20* (2018.01)
*F21S 45/10* (2018.01)
*F21S 45/47* (2018.01)

(52) U.S. Cl.
CPC ............... *F21S 45/33* (2018.01); *F21S 41/28* (2018.01); *F21S 45/10* (2018.01); *F21S 45/47* (2018.01)

(58) Field of Classification Search
CPC .. F21S 45/33; F21S 41/28; F21S 45/10; F21S 45/30; F21S 45/28; B60Q 1/0005
See application file for complete search history.

(56) References Cited

U.S. PATENT DOCUMENTS

2015/0023042 A1 1/2015 Lyon et al.

FOREIGN PATENT DOCUMENTS

| | | | |
|---|---|---|---|
| DE | 2727953 | A1 | 1/1979 |
| DE | 19724098 | A1 | 12/1998 |
| DE | 10213680 | A1 | 10/2003 |
| DE | 102005019651 | A1 | 11/2006 |
| DE | 102008019664 | A1 | 10/2008 |
| DE | 202019102469 | U1 | 7/2019 |
| EP | 1818609 | A2 | 8/2007 |
| EP | 2020569 | A2 | 2/2009 |
| EP | 2392494 | A2 | 12/2011 |
| JP | 05166402 | A | 7/1993 |

(Continued)

OTHER PUBLICATIONS

English Translation JP H0623103, Mar. 25, 1994 (Year: 1994).*
EP 2392494, Guido Boscher, Dec. 7, 2011, English translation (Year: 2011).*

*Primary Examiner* — William N Harris
*Assistant Examiner* — James M Endo
(74) *Attorney, Agent, or Firm* — Husch Blackwell LLP

(57) ABSTRACT

A cover lens for a vehicle lighting device is provided, and includes a visual section which is transparent and designated to form the light exit aperture of the lighting device. The cover lens also includes a blank section which is opaque and/or which is designated to be invisible from the exterior of the lighting device. The blank section includes at least one condensation area. The wall thickness of the condensation area is lower than the wall thickness of the visual section.

9 Claims, 3 Drawing Sheets

(56) References Cited

FOREIGN PATENT DOCUMENTS

| | | | | | |
|---|---|---|---|---|---|
| JP | HO623106 | * | 3/1994 | .............. | F21S 45/33 |
| JP | 09147604 | A | 6/1997 | | |
| KR | 1020130107056 | A | 10/2013 | | |
| KR | 1020150034467 | A | 4/2015 | | |

* cited by examiner

COVER LENS FOR A VEHICLE LIGHTING DEVICE

CROSS REFERENCE

This application claims priority to PCT Application No. PCT/EP2020/077068, filed Sep. 28, 2020, the entirety of which is hereby incorporated by reference.

FIELD OF THE INVENTION

The present invention relates to a cover lens for a vehicle lighting device comprising a visual section, which is transparent and designated to form the light exit aperture of the lighting device, and a blank section, which is opaque and/or which is designated to be invisible from the exterior of the lighting device. The invention further relates to a corresponding vehicle lighting device.

BACKGROUND OF THE INVENTION

The invention addresses the problem of condensation of water from air moisture in the interior of vehicle lighting devices, especially bedewing of the inner surface of the cover lens. The problem nowadays occurs to an increasing degree in the course of using light-emitting diodes (LED) as primary light sources for vehicle lighting devices. Due to the low degree of infrared radiation and waste heat emitted by LEDs, there is a significantly reduced degree of heating of the surrounding components compared to formerly used light sources, e.g. halogen bulbs. Therefore, the cover lens, which is furthest spaced apart from the light source and exposed to cooling airstreams during vehicle operation, is especially prone to bedewing.

The cover lens represents the foremost component of the lighting device with respect to the designated mounting position in a vehicle. It is typically injection-moulded e.g. from a transparent polycarbonate and features a free-form geometry dedicated to the particular lighting device. The central portion of the cover lens typically comprises the transparent visual section serving as the light exit aperture of the lighting device.

The remaining portion of the cover lens, the blank section, is designated to be covered by the housing of the lighting device and/or it is designated to screen portions of the interior of the lighting device for an observer. To the latter purpose, the blank section is opaque and the cover lens is manufactured e.g. by a two-step injection moulding process using transparent and black-coloured moulding compounds.

Condensation of water on the inner surface of the cover lens, i.e. on the surface facing the interior of the lighting device, possibly interferes with the lighting function of the lighting device and might also represent a flaw based on the aesthetic perception of an observer. Especially, there is a corresponding bedewing test within the Federal Motor Vehicle Safety Standard 108 (FMVSS 108), which regulates all automotive lighting, signalling and reflective devices in the United States. Similar standards apply to further countries, e.g. Canada.

There are several different approaches known in the prior art to address the issue of cover lens bedewing. The documents DE 197 24 098 A1 and DE 10 2008 019 664 A1 for instance disclose cover lenses with integrated heating devices in the form of metallic layers serving as resistance heaters. The documents EP 2 020 569 A2, DE 10 2016 122 874 A1 and DE 20 2019 102 469 U1 teach the implementation of ventilation systems by a combination of fan devices and air in/outlet openings in the lighting device. The documents DE 10 2005 019 651 A1 and EP 1 818 609 A2 disclose the integration of drying means in order to decrease the degree of air humidity in the interior of the lighting device. Finally, the DE 102 13 680 A1 proposes to integrate a Peltier cooling element into the lighting device acting as local condensation element.

BRIEF SUMMARY

It is an object of the present invention to provide a new approach for the reduction of the bedewing of a cover lens in vehicle lighting device.

The invention discloses the technical teaching that the blank section of the cover lens comprises at least one condensation area, wherein the wall thickness of the condensation area is lower than the wall thickness of the visual section.

The core of the invention lies in the creation of a passive condensation trap in form of the thin-walled condensation area. Due to its lower wall thickness, there is a faster heat transmission from the interior of the lighting device to the exterior through the condensation area compared to the visual section, i.e. the cooling rate at the inner surface of the condensation area is higher than at the inner surface of the visual section. Consequently, during a cooling phase, the temperature drops below the critical dew point for a given humidity level at the inner surface of the condensation area at first, i.e. the bedewing process is initiated at the condensation area. By appropriate sizing of the condensation area, the amount of condensed water trapped at the condensation area represents a significant portion of the entire moisture contained in the interior of the lighting device, so that the local humidity at the inner surface of the visual section is lowered by such a degree, which is sufficient to prevent any condensation of water. Therefore, the inventive cover lens restricts the bedewing to an area, which is invisible from the exterior of the lighting device, while the visual section as the light exit area remains free of condensed water. In contrast to the approaches known in the prior art, the invention achieves this functionality by purely constructive means, instead of using powered auxiliary devices like fans or heating elements.

In a preferred embodiment of the inventive cover lens, the condensation area is arranged below the visual section with respect to a designated mounting position of the lighting device. Such an arrangement prevents that condensed water trapped at the condensation area flows or trickles towards the visual section under the influence of gravity and/or vibrations during vehicle operation.

Advantageously, the wall thickness of the condensation area amounts to 1% to 90% of the wall thickness of the visual section. The thinner the cover lens in the condensation area compared to the visual section, the higher the difference in the local cooling rates at the inner surfaces. Exemplary thickness values amount to 3 mm for the visual section and 1.5 mm for the condensation area. Anyways, the detailed choice of the wall thickness ratio also depends on considerations concerning the mechanical stability of the cover lens. The lateral sizing of the condensation area represents a further important factor determining the amount of trapped condensed water.

According to another preferred embodiment of the inventive cover lens, the blank section comprises several condensation areas, which are arranged peripherally around the visual section. Such an arrangement yields a spatially homogeneous humidity removal from the air around the visual section. For example, as an additional degree of constructive freedom, the wall thickness may vary among the different condensation areas.

Advantageously, the condensation area features a hexagonal contour. In the technical field of light weight construction, hexagonal structures or similar appropriate pattern are well-known means to enhance the stiffness of thin-wall components. For the inventive cover lens, it was found that a proper arrangement of several thin-walled condensation areas even enhances the stiffness of the blank section compared to the case of a reference cover lens with all homogeneous wall thickness.

With further advantage the condensation area features a surface structure dedicated to increase the wettability with water. An increased wettability improves the capacity of the condensation area in terms of bonding and thus storage of condensed water. Appropriate surface structures for instance comprise dimple pattern or an adjusted roughness level.

Furthermore, the invention concerns a vehicle lighting device comprising a cover lens according to one of the previous embodiments. The lighting device may especially be configured as a vehicle head light.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
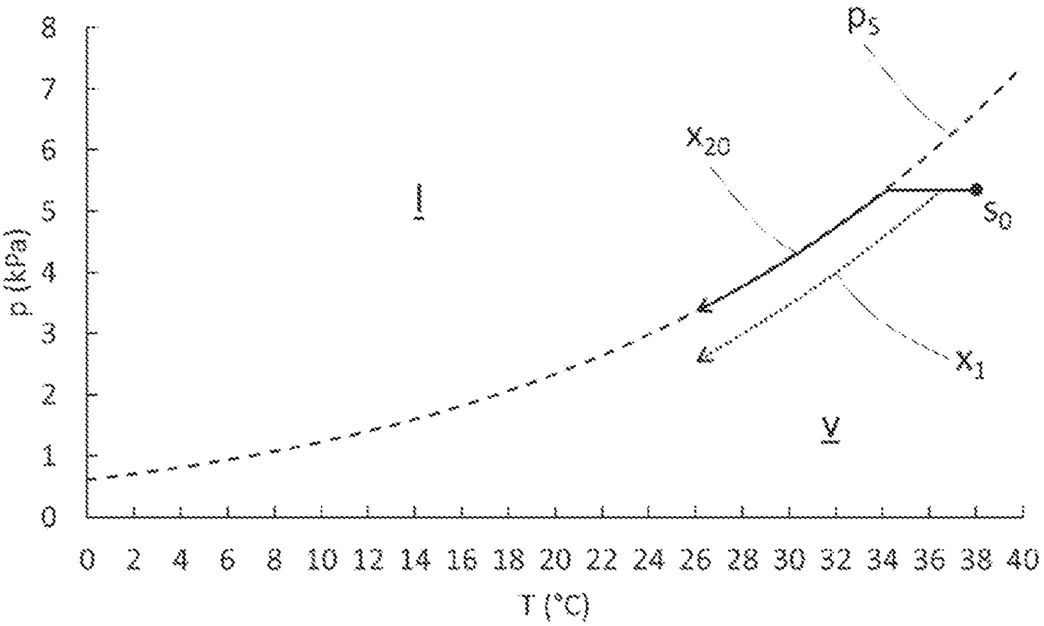
FIG. 1 is a graph of the dew point curve of water in air.

FIG. 1 shows the dew point curve of water in air at sea level pressure, i.e. the saturation vapour pressure $p_s$ as a function of the temperature T and the water vapour partial pressure p. The dew point curve separates the liquid water phase l from the water vapour phase v.

In the following, the bedewing properties of the inventive cover lens shall be discussed exemplarily in the context of the bedewing test for vehicle head lights according to the FMVSS 108 standard. In this test, the lighting device is subject to a conditioning stage, after which it is prepared in the initial condition s0 as depicted in FIG. 1, i.e. featuring a temperature of T=38° C. and humidity of about 80% inside the lighting device corresponding to a water vapour partial pressure of p=5.3 kPa. In the following, the lighting device under test is put into a wind tunnel and subject to a constant air stream with a temperature of T=26° C. Starting from the same initial condition s0, the local air volumes at the inner surfaces of the visual section and the condensation area evolve along the different phase space trajectories x1 and x20, respectively. Due to the higher cooling rates at the thin-walled condensation area, the local temperature there reaches the dew point around T=34° C. at first, and condensation of water from the supersaturated water vapour sets in. In the following, the cooling rates at the condensation area are for instance high enough to pin the related trajectory x20 right to the dew point curve, thus permanently bedewing the inner surface of the condensation area and in turn lowering the humidity of the remaining air volume in the interior of the lighting device. At the inner surface of the visual section, the air temperature remains higher during the (early) cooling stage compared to the condensation area and the temperature of T=34° C., corresponding to the initial dew point temperature, is only reached after condensation has already set in at the condensation area, i.e. at a point in time, in which the humidity of the air is already significantly lowered. Consequently, water partial pressure remains at a subcritical level at the inner surface of the visual section, and with the condensation area constantly trapping more water from the ambient, phase space trajectory x1 of the air volume at the inner surface of the visual section runs through the vapour phase v during the entire test procedure. Finally, all condensed water is confined to the condensation section, which is invisible from the exterior of the lighting device, and the visual section is free of any bedewing.

Figure 2A:
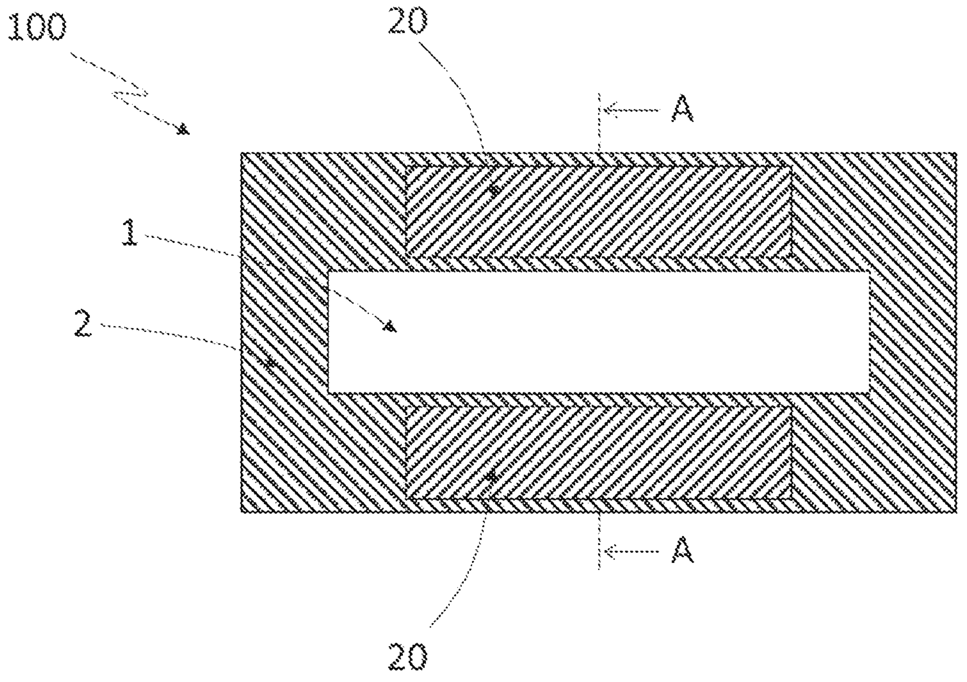
FIG. 2*a* is a sketch in front view of an inventive cover lens.

FIG. 2*a* shows a sketch in front view of an inventive cover lens 100 for a vehicle lighting device comprising a visual section 1, which is transparent and designated to form the light exit aperture of the lighting device, and a blank section 2, which is opaque and/or which is designated to be invisible from the exterior of the lighting device. Especially, the blank section 2 may be covered by the housing of the lighting device or by a portion of the vehicle body. The cover lens 100 may be injection moulded as one piece of equal material or the visual section 1 and the blank section 2 are manufactured and joint in a multiple-step process, especially from transparent and opaque materials, respectively. The blank section 2 comprises the two condensation areas 20 below and above the visual section 1, wherein the wall thickness of the condensation areas, i.e. the thickness along the direction perpendicular to the plane of the sketch, is lower than the wall thickness of the visual section 1.

Figure 2B:
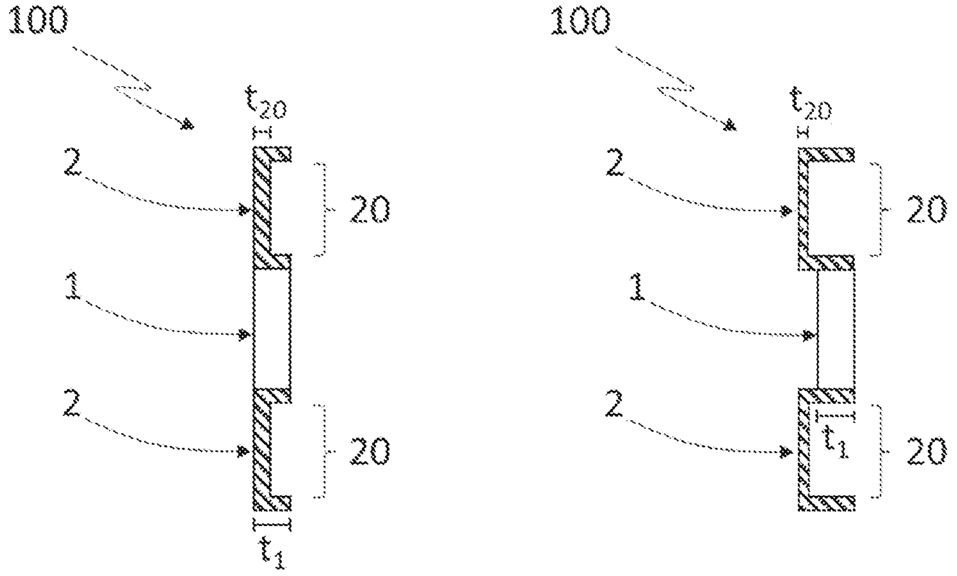
FIG. 2*b* is cross-sections of alternative embodiments related to FIG. 2*a*.

FIG. 2*b* shows cross-sections of alternative embodiments of the schematic cover lens 100 of FIG. 2*a*, wherein the cross-sections correspond to the line AA in FIG. 2*a*. The embodiment on the left-hand side features condensation areas 2 with a wall thickness t20 corresponding to 50% of the wall thickness t1 of the visual section 1. The embodiment on the right-hand side features condensation areas 2 with a wall thickness t20 corresponding to 25% of the wall thickness t1 of the visual section 1, and furthermore, the condensation areas 20 protrude over the visual section 1. Through such protuberance, the condensation areas 20 are possibly more exposed to cooling air streams during vehicle operation or test procedure, so that the bedewing condition is further improved.

Figure 3:
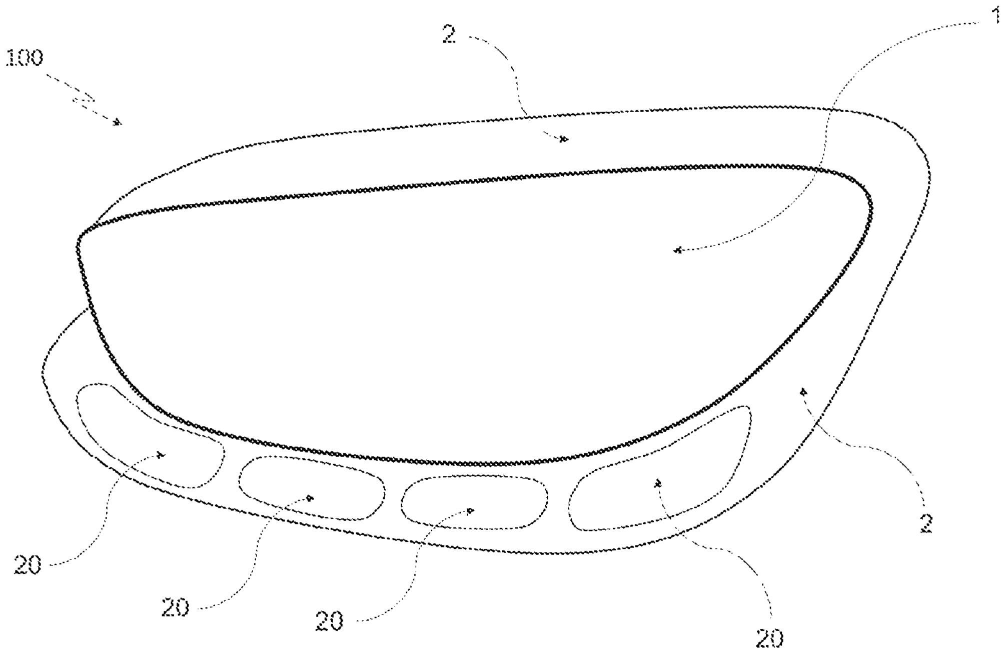
FIG. 3 is a sketch in front view of a second embodiment of the inventive cover lens.
Figure 4:
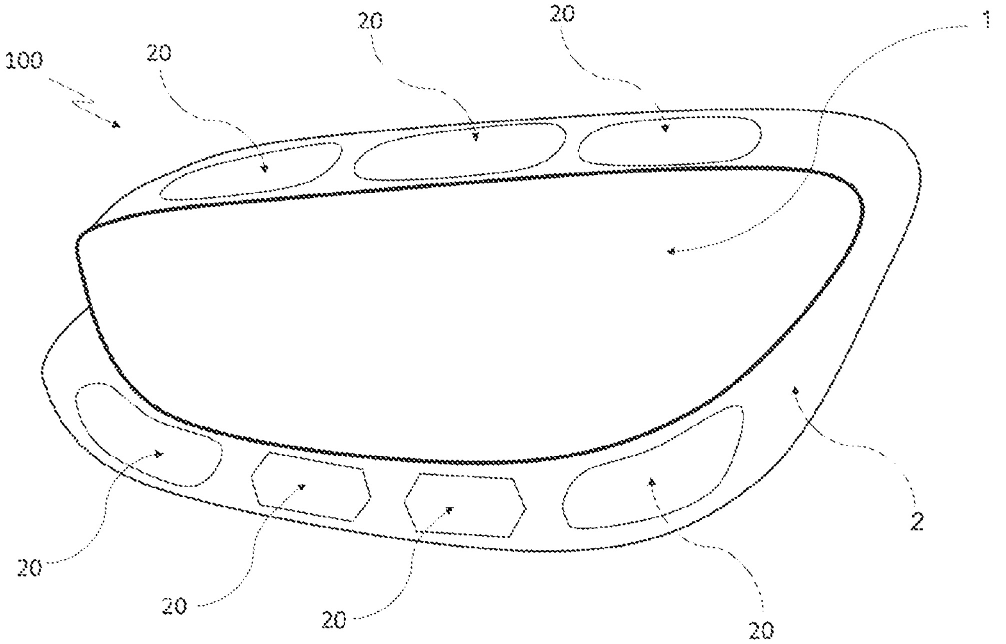
FIG. 4 is a sketch in front view of a third embodiment of the inventive cover lens.

FIG. 3 and FIG. 4 show sketches in front view of further preferred embodiments of the inventive cover lens 100 dedicated for a vehicle head light. The cover lens 100 features a free-form geometry with a foremost wedge-shaped visual section 1 and a rearwardly curved blank section 2.

In FIG. 3 the four condensation sections 20 are arranged below the visual section 1 in order to prevent condensed water from running towards the visual section 1. The cover lens 100 of FIG. 4 also features additional condensation sections 20 above the visual section 1 to yield a peripheral arrangement of condensation sections 20. The lateral size and contour shape vary among the different condensation sections 20 and can be adjusted e.g. according to the geometry and dimensions of the corresponding lighting device. A stiffening effect results especially from the hexagonal shapes of the two condensation sections 20 on the bottom portion of the blank section 2 in FIG. 4.

The present invention is not limited by the embodiments described above, which are presented as examples only and can be modified in various ways within the scope of protection defined by the appending patent claims.

LIST OF NUMERALS

100 cover lens
1 visual section
2 blank section
20 condensation area
t1 wall thickness of visual section
t20 wall thickness of condensation area
T temperature
p water vapour partial pressure
$p_s$ saturation vapour pressure
l liquid phase
v vapour phase
s0 initial condition
x1 phase space trajectory
x20 phase space trajectory

We claim:

1. A cover lens for a vehicle lighting device, the cover lens comprising:

a visual section which is transparent and forms a light exit aperture of the lighting device, and a blank section which is opaque and/or which is invisible from an exterior of the lighting device, the blank section including two or more condensation areas, wherein a wall thickness of the two or more condensation areas is lower than a wall thickness of the visual section, and wherein at least one of the two or more condensation areas has a hexagonal shape including three pairs of equivalent internal angles.

2. The cover lens according to claim 1, wherein the two or more condensation areas are arranged below the visual section with respect to a designated mounting position of the lighting device.

3. The cover lens according to claim 1, wherein the wall thickness of the two or more condensation areas amounts to between 1% and 90% of the wall thickness of the visual section.

4. The cover lens according to claim 1, wherein the blank section comprises several condensation areas arranged peripherally around the visual section.

5. The cover lens according to claim 4, wherein the wall thickness varies among the different condensation areas.

6. The cover lens according to claim 1, wherein at least one of the two or more condensation areas features a surface structure dedicated to increase the wettability with water.

7. The cover lens according to claim 1, wherein at least one of the two or more condensation areas is arranged above the visual section with respect to a designated mounting position of the lighting device.

8. A vehicle lighting device comprising a cover lens according to claim 1.

9. A cover lens for a vehicle lighting device, the cover lens comprising:

a visual section which is transparent and forms a light exit aperture of the lighting device;

a blank section which is opaque and/or which is invisible from an exterior of the lighting device; and one or more condensation areas positioned on the blank section, wherein a wall thickness of the one or more condensation areas is lower than a wall thickness of the visual section, and wherein the condensation areas protrude over the visual section.

* * * * *